United States Patent
Ehrlich et al.

(10) Patent No.: US 6,895,824 B2
(45) Date of Patent: May 24, 2005

(54) APPARATUS FOR MEASURING THE VELOCITY AND/OR THROUGH-FLOW OF A FLUID

(75) Inventors: Andreas Ehrlich, Dresden (DE); Gerry Schroeter, Dresden (DE)

(73) Assignee: Sick AG, Waldkirch (DE)

( * ) Notice: Subject to any disclaimer, the term of this patent is extended or adjusted under 35 U.S.C. 154(b) by 124 days.

(21) Appl. No.: 10/243,635

(22) Filed: Sep. 12, 2002

(65) Prior Publication Data

US 2003/0084732 A1 May 8, 2003

(51) Int. Cl.⁷ .................................................. G01F 1/66
(52) U.S. Cl. ................................................ 73/861.26
(58) Field of Search ................... 73/861.25, 861.26, 73/861.27, 861.22, 861.23, 861.24, 861.42, 861.28, 851.29, 851.52, 861.56

(56) References Cited

U.S. PATENT DOCUMENTS

| | | | |
|---|---|---|---|
| 4,631,967 A | * 12/1986 | Welker | 73/861.25 |
| 4,735,094 A | * 4/1988 | Marsh | 73/861.24 |
| 4,988,155 A | * 1/1991 | Harner et al. | 385/12 |
| 5,090,871 A | * 2/1992 | Story et al. | 417/9 |
| 5,440,936 A | 8/1995 | Spani et al. | |
| 5,445,035 A | * 8/1995 | Delajoud | 73/861.52 |
| 6,038,927 A | * 3/2000 | Karas | 73/706 |
| 6,053,053 A | * 4/2000 | Huotari | 73/861.22 |
| 6,098,466 A | * 8/2000 | Shkarlet | 73/861.25 |
| 6,557,417 B1 | * 5/2003 | Liu | 73/714 |
| 6,675,658 B2 | * 1/2004 | Petrich et al. | 73/756 |

FOREIGN PATENT DOCUMENTS

| | | | |
|---|---|---|---|
| DE | 44 39 399 | * | 5/1996 |
| DE | 197 13 526 A1 | | 10/1998 |
| DE | 297 15 090 U1 | | 10/1998 |
| DE | 197 29 473 A1 | | 2/1999 |
| WO | WO 96 13701 A2 | | 5/1996 |

* cited by examiner

*Primary Examiner*—Max Noori
(74) *Attorney, Agent, or Firm*—Townsend and Townsend and Crew LLP

(57) ABSTRACT

A body for a flow meter for measuring the flow velocity and/or the volumetric through-flow of fluids. The flow meter body has a tubular center piece with connecting flanges for connection to a pipeline for fluids. On its exterior, the center piece has at least two substantially flat mounting surfaces (18, 20, 22, 24), each of which has at least one receptacle (32, 34; 38, 40, 42, 44) for mounting a probe (35). To enable the use of linearly emitting ultrasound probes in such flow meters, and to use the flow meter as a substitute for prior art flow meters without significant effort and cost, it is proposed to arrange the mounting surfaces (18 and 20; 22 and 24) diametrically opposite each other as a mounting surface pair (18–20; 22–24) so that the probes (35) in the opposing mounting surfaces (18 and 20; 22 and 24) define a measuring path (36, 46, 48). The mounting surfaces (18 and 20; 22 and 24) are parallel to each other and at an angle to a longitudinal axis (26) of center piece (12).

13 Claims, 4 Drawing Sheets

APPARATUS FOR MEASURING THE VELOCITY AND/OR THROUGH-FLOW OF A FLUID

The invention concerns flow meter bodies for measuring the flow velocity and/or the volumetric through-flow of fluids in accordance with the preamble of claim 1, as well as an arrangement having such a through-flow apparatus.

Known process flow-through measurement installations make use of several different measuring methods.

Today it is common to use turbine wheel counters which measure the throughput relatively accurately.

Ultrasound counters are increasingly used for measuring the flow-through. They principally employ a flow meter body which includes a connecting flange welded onto a section of pipe. The ultrasound converters or probes are positioned in receptacles in the pipe section of the flow meter body. Necessary hard and software for signal processing the ultrasound signals is also provided.

Ultrasound measurement involves detecting a difference in travel time between two ultrasound signals which have a component in the flow direction and another component opposite the flow direction. For this it is necessary that the signals are emitted and received at an angle other than 90° to the flow direction.

There are two methods by which these angles can be realized.

In one, the flow meter body has a short connecting piece that is obliquely welded onto the pipe section. It mounts the ultrasound probes which linearly emit and receive the ultrasound signals. Such flow meters are available, for example, from a company called Daniel, of Texas, USA. Obliquely welding small-diameter connecting pipe pieces is technically difficult because the pipe pieces which mount the ultrasound probes require high positional accuracy. Further, to provide the required access for welding, the entire flow meter body is longer than would otherwise be necessary. As a result, it is not possible to simply replace a turbine counter with an ultrasound counter. Instead, the existing pipeline which is to receive the counter must first be shortened, which entails costly operations such as severing the pipeline, welding new flanges onto it, performing new leak tests and the like. In addition, welded structures require costly inspections and testing, and welding can lead to thermal distortions which can compromise the needed precision positioning of the mounts for the ultrasound probes. Further, such flow meter bodies cannot be mass-produced because many details, such as the position of the receptacles, the number of receptacles and associated tasks, such as preparing the connecting pipe pieces, welding, testing and a mechanical finishing, must be customized for each installation. Altogether, therefore, this approach requires significant effort and involves correspondingly high costs.

In the other approach, ultrasound probes with a beveled or chamfered surface are installed perpendicular to the axis of the flow meter body so that the ultrasound signals are emitted in the direction of the bevel.

Gas counters with beveled probe surfaces are commercially available from Instromet GmbH. The flow meter body of this counter has a hexagonal periphery (in cross-section). The beveled ultrasound probes are placed in appropriate receptacles formed in the individual peripheral surfaces of the hexagonal center piece and perpendicular to the axis of the flow meter. The beveled ultrasound probes must extend into the fluid flow, which causes them to interfere with the through-flow profile. This is disadvantageous because it can lead to measuring inaccuracies, and gas counters in particular demand precision since even minute errors in the measured through-flow can lead to immense price deviations, for example when the counter is used by suppliers of large amounts of gas. A further disadvantage of this arrangement is that beveled probes are useable over only predetermined frequency and performance ranges. These requirements dictate that the measurement paths should be made as long as possible, as is described in more detail in U.S. Pat. No. 6,041,663. The measuring paths rely on reflections off the walls of the flow meter body which require a lengthening of the entire instrument. This in turn is disadvantageous because existing counters can only be replaced with substantial efforts, for example by requiring a shortening of the pipeline.

In view thereof, it is an object of the invention to provide an improved flow meter which overcomes the above summarized disadvantages encountered in the prior art and, in particular, which makes it possible to replace known flow meters without great effort.

This object is attained with a flow meter body constructed in accordance with the characterizing portion of claim 1.

The flow meter body of the present invention has a tubular center piece, the exterior of which has at least two substantially flat, diametrically opposed mounting surfaces which define a mounting surface pair. Measurement units are arranged on the opposing mounting surfaces and define a measuring path. The measuring surfaces are parallel to each other and arranged at an angle to the longitudinal axis of the center piece.

The present invention uses linearly emitting ultrasound probes. The flat mounting surfaces that are at an angle to the axis of the flow meter assure a precise directionality of the probe and of the received and/or emitted ultrasound signals. The angle is selected so that the connecting flanges do not interfere with the precision machining of the mounting surfaces.

It is best and simplest to form the receptacles for the probes as bores which are drilled into the mounting surfaces. In this manner, costly welding, which can lead to thermal distortions and requires costly testing, is eliminated. Thus, the probes are mounted in the simplest possible manner to attain a very precise positioning for them.

The simple manner in which the probes are mounted on the flow meter body makes it possible to vary the position of the receptacles; that is, in its unfinished state the flow meter body is the same regardless of mounting variations that will be encountered at specific installations. Needed variations are attained by appropriately varying the number of receptacles and their positions. This leads to a cost effective standardization for given nominal diameters of the flow meter as well as variations in its connecting flange sizes.

Advantageous embodiments of the invention are the subject of the dependent claims.

A flow meter body constructed in accordance with the invention will typically have a length of about three times the diameter of the pipeline. This has the particular advantage that the known turbine wheel counters can be readily replaced since they also fit within these dimensions.

The accuracy of measuring the through-flow can be enhanced with additional measuring paths. In one embodiment of the invention, at least two additional mounting surfaces are provided which together form an additional mounting surface pair. This additional mounting surface pair is rotated relative to the first mounting surface pair about an axis that is parallel to the first mounting surfaces and perpendicular to the longitudinal axis of the flow meter.

In a space-saving arrangement, mounting surfaces which are adjacent each other in the longitudinal direction are mirror symmetric relative to a first center plane of the flow meter which is perpendicular to the longitudinal axis.

For a precise orientation of the probes, it is most practical to arrange the probes so that their measuring direction is perpendicular to the associated mounting surface.

To enhance the accuracy of through-flow measurements, different measuring paths are provided at differing distances to the longitudinal axis. In this manner, differences in the flow profile over the cross-section of the flow can be taken into consideration for determining the total through-flow with appropriate integration methods. It is advantageous if there are at least two measuring paths in at least one of the mounting surface pairs.

To eliminate the need for any welding, the center piece and its connecting flanges and probe receptacles are of a one-piece construction, and they are preferably made by a casting process. Casting processes are particularly advantageous when it is not necessary to produce intricately shaped connecting pipes and the like. Machining such a monolithically built flow meter body to give it its desired final shape can be limited to locations on the body requiring precision and/or predefined surface finishes, for example where the receptacles for the probes are to be positioned.

In view of the positioning of the mounting surfaces as provided by the present invention, there is sufficient space for mounting a signal processing unit on a side of the center piece not occupied by a mounting surface. No separate attachment means are required. The signal processing unit can be directly attached to the center piece, for example with threaded bolts.

As a result of the monolithic character of the flow meter body and the angular orientation of the mounting surfaces, there is sufficient wall thickness to place electric cables between the probes and the signal processing unit in a covered conduit, preferably by locating the conduits at least partially in the walls of the body. In a particularly preferred embodiment, there are bores in the walls of the center piece through which the electric cables extend. The bores preferably extend from the respective mounting surfaces to a mounting area for the signal processing unit.

To protect the probes, they are covered by at least one cap, preferably a cap which also covers the cables for the respective probes over at least a portion of their length. The arrangement is advantageously simplified by providing a cap which covers the entire mounting surface, including the probes and their respective connecting cables.

Covering the electric cables has the advantage that they are protected against accidental and intentional damage. Apparatus for measuring through-flow in accordance with the present invention is used in rough industrial environments, for example by the chemical industry, in natural gas fields, at transfer stations or in transmission pipelines. In such environments, the instruments, which, depending on their nominal diameter, can have substantial weight, are often handled with heavy equipment such as forklifts. Unprotected cables pose a significant risk of instrument down-time since they can be damaged or severed during their installation, inspection or maintenance. In addition, the cables are exposed to bad weather and other atmospheric influences such as being gnawed on by wild animals. Covered cables are protected from such damage. A further advantage of covered cables is that they render the flow meter much more easily handled since no interfering cables are present.

It is a further objective of the invention to provide an improved flow meter for measuring the flow velocity and/or the through-flow of a fluid, which is solved with the flow meter body of the present invention.

The flow meter of the present invention is preferably used as a gas counter.

The invention is further described by reference to an exemplary embodiment and reference to the following drawings.

Figure 1:
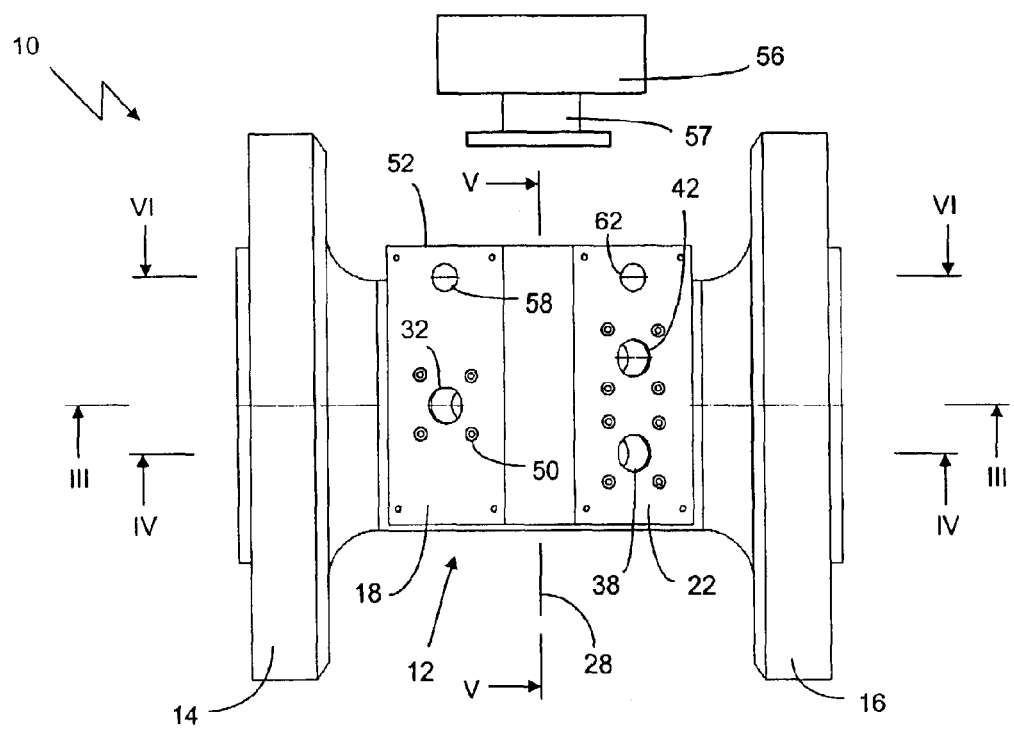
FIG. 1 is a side elevational view of a flow meter constructed in accordance with the present invention.
Figure 2:
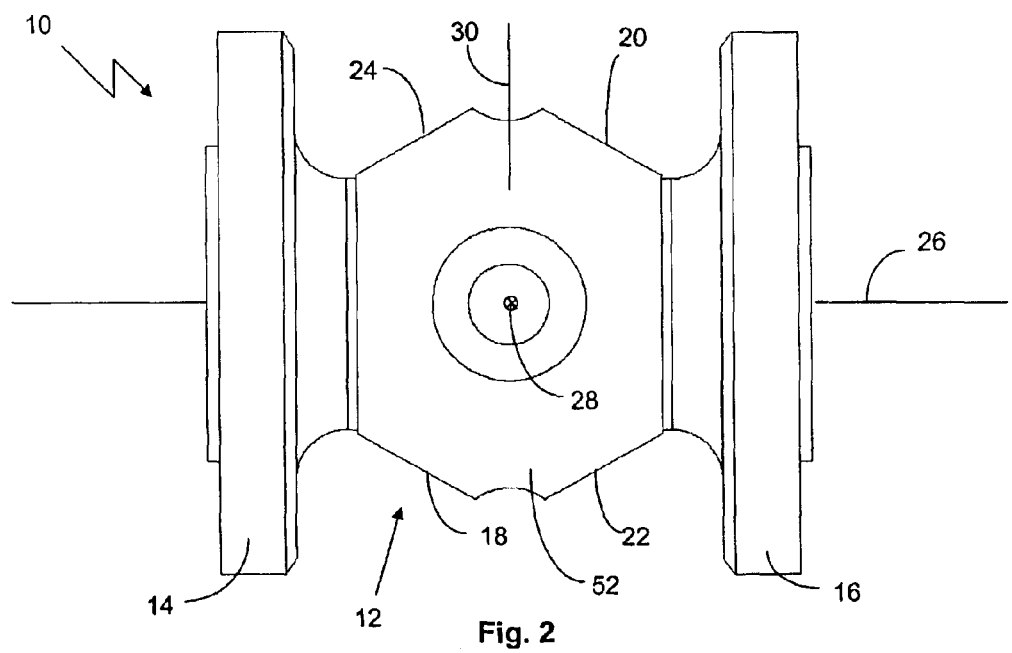
FIG. 2 is a plan view of the flow meter shown in FIG. 1.

A flow meter body 10 made in accordance with the invention has a tubular center piece 12 arranged between connecting flanges 14 and 16. The interior of the center piece 12 is preferably cylindrical with a diameter D for connection to a pipeline (not separately shown) carrying a fluid.

On its exterior, center piece 12 has at least two and preferably four substantially planar mounting surfaces 18, 20, 22 and 24. Pairs of the mounting surfaces are parallel, diametrically opposed, and define mounting surface pairs 18–20 and 22–24, respectively. The mounting surfaces 18, 20, 22 and 24 are arranged at an angle to the longitudinal axis 26 of center piece 12, which also defines the flow axis and the axis of the flow meter body. The mounting surface pairs 18–20 and 22–24 are rotated relative to an axis 28 which is parallel to the mounting surfaces and perpendicular to the longitudinal axis 26. This provides a space- and material-saving arrangement of the four mounting surfaces.

In the illustrated embodiment, the angle between a line perpendicular to the mounting surfaces and the longitudinal axis 26 is approximately 60°. Other angles are also possible. The angle should be selected so that the mounting surface is readily reachable with the required working tools and according to the extent to which the measurement axis described below should be angularly inclined.

In this arrangement, longitudinally adjacent mounting surfaces 18 and 22 as well as 20 and 24, respectively, are mirror symmetric relative to a center plane 30 that is perpendicular to longitudinal axis 26.

In the preferred embodiment, the length L of flow meter body 10 is about three times its nominal diameter D.

Figure 3:
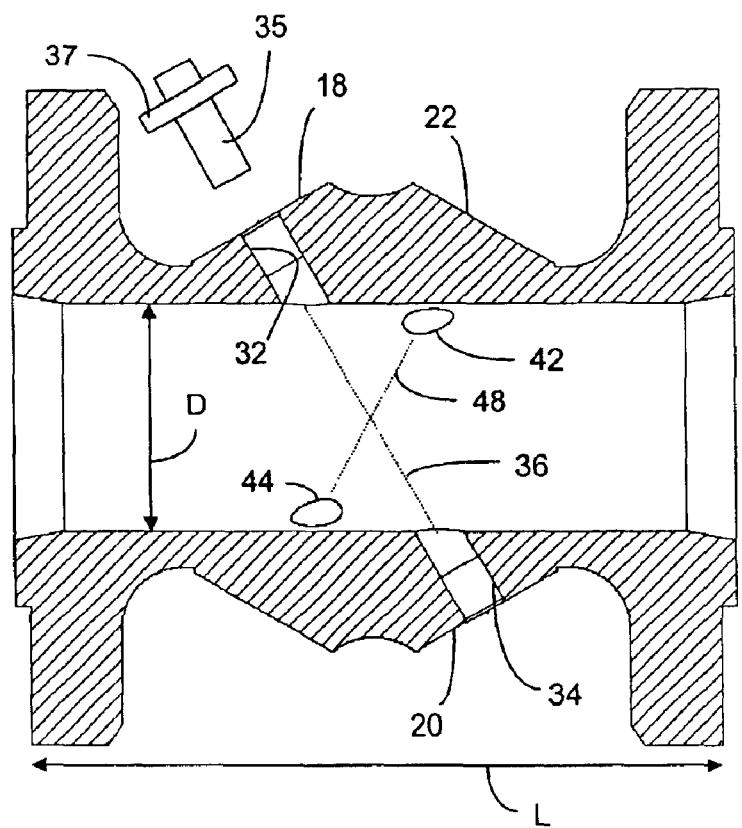
FIGS. 3 to 6 are cross-sectional views taken along lines III—III, IV—IV, V—V and VI—VI of FIG. 1.
Figure 4:
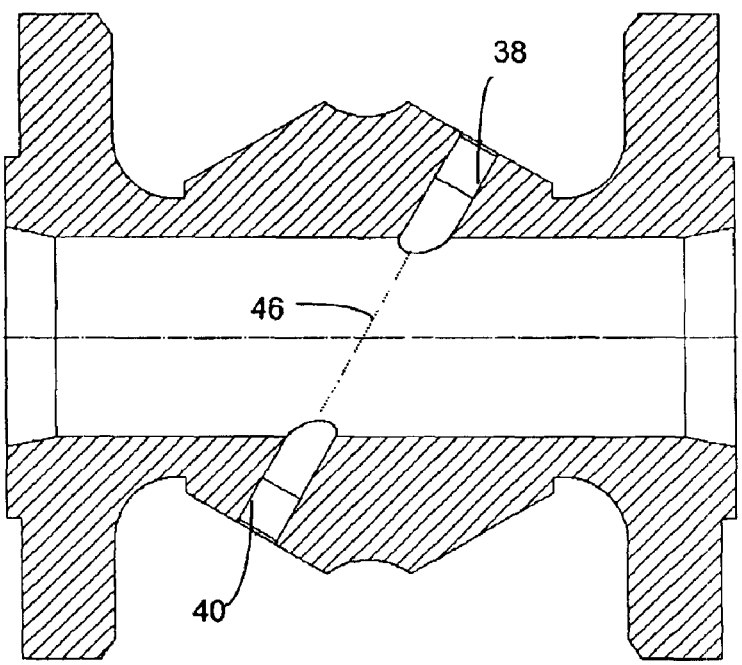
Figure 5:
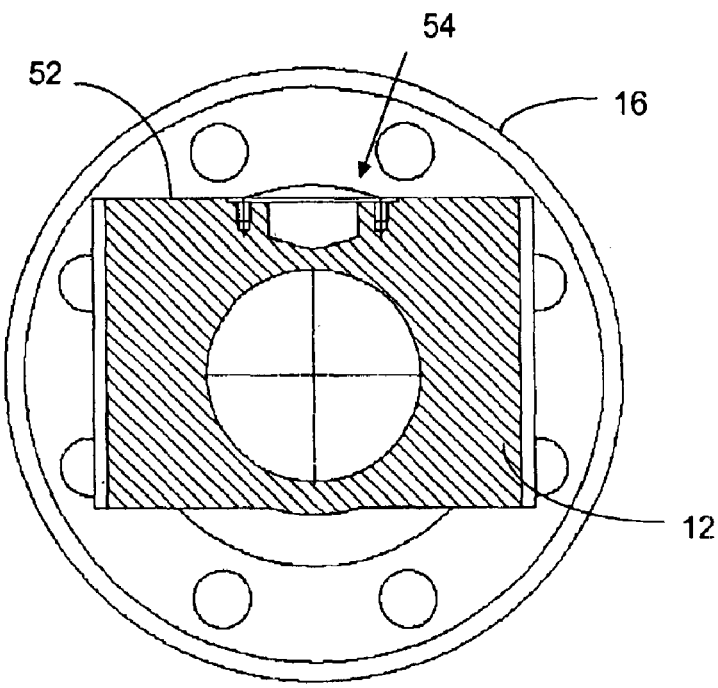
Figure 6:
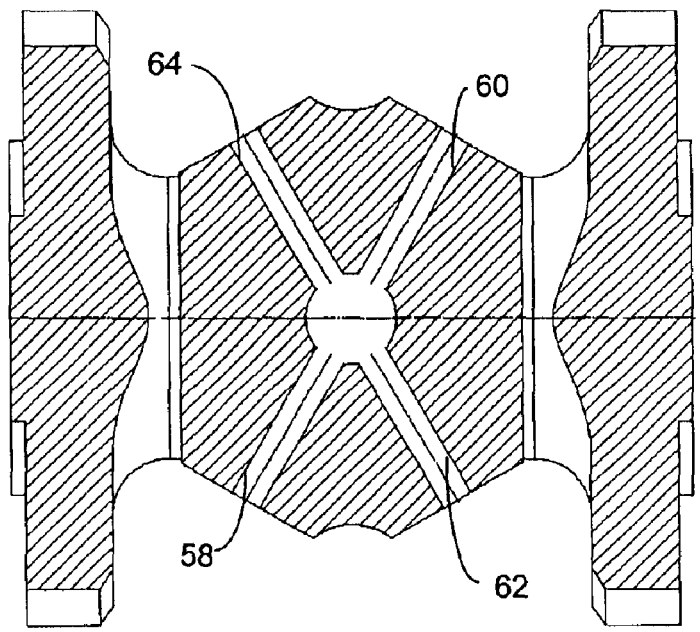
Figure 7:
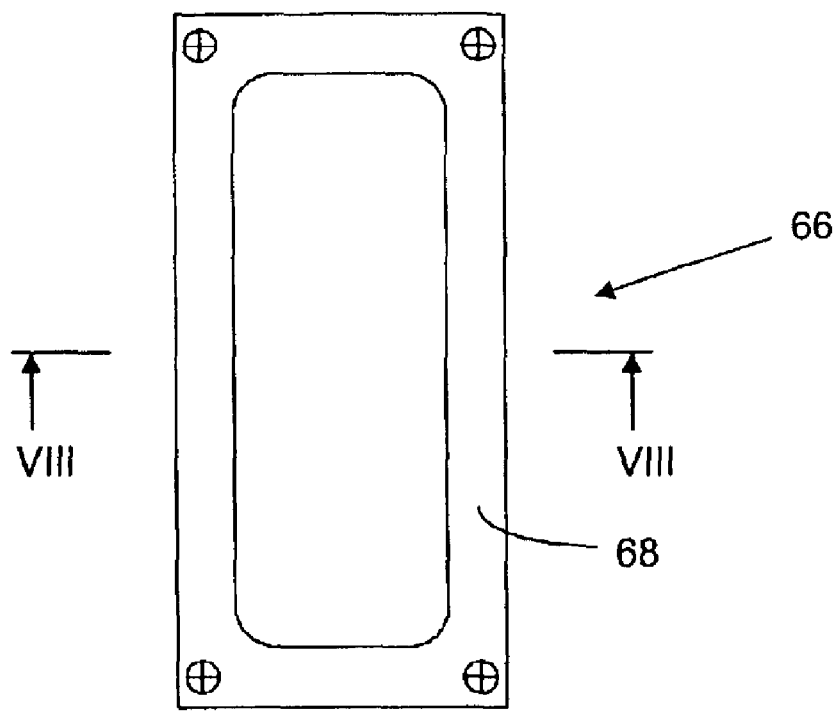
FIG. 7 is an elevational view of a cap.
Figure 8:
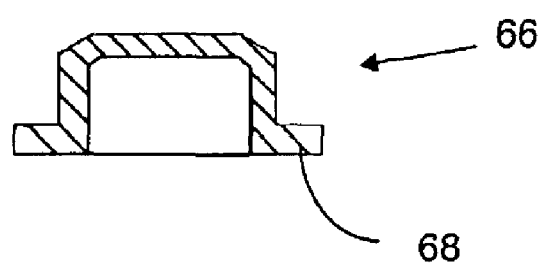
FIG. 8 is a cross-section of the cap shown in FIG. 7.

Mounting surfaces 18 and 20 each have a receptacle 32, 34 into which a probe 35, for example an ultrasound transducer, can be placed. Such a probe 35 is schematically illustrated in FIG. 3. Receptacles 32 and 34 are precisely aligned so that the probes 35 placed into them are in alignment and define a measurement axis 36. The probes linearly emit and receive the ultrasound in the direction of measurement axis 36. In the illustrated embodiment, measurement axis 36 intersects axis 26 of the flow meter.

For measuring flow in areas offset from the center axis, probe receiving receptacles 38, 40 and 42, 44 are provided in mounting surfaces 22 and 24. These receptacles are arranged so that they define measurement axes 46, 48 that are spaced from the center of the tubular cross-section of flow meter body 10 and at a distance from measurement axis 26.

The illustrated embodiment of the invention has three measurement axes 36, 46 and 48. It is possible to provide additional measurement axes in like manner. The probes have mounting flanges 37 which abut against mounting surfaces 18, 20, 22 and 24 and which are secured thereto with appropriate fasteners, such as bolts engaging threaded bores 50. The number of probes that can be mounted on any given mounting surface depends on the size of their mounting flanges 37. To increase the number of probes, the probes can alternatively be threaded directly into correspondingly threaded receptacles and secured thereto with cap nuts. In this example, the number of possible measurement axes will be limited by the outer diameter of the cap nut.

Upper surface 52 of flow meter 10 is planar and defines a mounting area 54 for a signal processing unit 56 which is schematically shown in FIG. 1. Mounting surfaces 18, 20, 22 and 24 extend all the way to upper surface 52. The wall thickness of center piece 12 beneath upper surface 52 is sufficiently large so that bore conduits 58, 60, 62 and 64 can be arranged approximately parallel to upper surface 52. These conduits extend from mounting surfaces 18, 20, 22 and 24 to mounting area 54.

Electrical cables extend through conduits 58, 60, 62 and 64 from signal processing unit 56 via a mounting base 57 thereof to the individual probes. In this manner, cable extending from inside mounting base 57 and emerging from mounting surfaces 18, 20, 22, 24 lie protected inside the wall of the center piece 12.

In addition, a cap 66 is provided for each mounting surface 18, 20, 22, 24 which not only covers the probes but also the cables emerging from bores 58, 60, 62, 64. Caps 66 are suitably secured to center piece 12, for example with four screws each. Caps 66 are preferably shaped and dimensioned so that their peripheries 68 correspond to the edges of the respective mounting surfaces so that the caps cover the entire mounting surfaces.

Flow meter body 10 is of unitary construction; that is, its center piece 12, connecting flanges 14 and 16, as well as receptacles 32, 34, 38, 40, 42 and 44 for the measuring instruments, are made of a single piece of material to avoid having to weld or similarly interconnect several workpieces into a flow meter body. The flow meter 10 is preferably produced by first casting it and thereafter accurately machining those surfaces where precision is required, for example mounting surfaces 18, 20, 22 and 24 and probe receptacles 32, 34, 38, 40, 42 and 44.

Flow meter body 10 is part for an apparatus for measuring the flow velocity and/or the throughput flow of a fluid in accordance with the present invention, particularly for use in gas meters. Components of gas meters are flow meter body 10, probes 35 (ultrasound transducers), signal processing unit 56, and associated electric cables between probes 35 and the signal processing unit.

The fluid flow through the interior of flow meter 10 is determined by measuring the time difference between the release and reception of ultrasound signals directed in and against the flow direction of the fluid. The flow velocity and therewith the flow-through volume are then calculated from this difference. The ultrasound probes 35 serve both as emitters and receptors so that each measuring axis can be used for sending ultrasound signals in both directions.

To prevent non-uniformities in the flow-through profile over the cross-section of the flow from adversely affecting the results, multiple measuring axes 36, 46 and 48 are provided which analyze the flow-through profile at diverse locations and at different distances from the axis 26 of the flow meter. The individual results from the various measurement axes are then combined and appropriately integrated to arrive at the volumetric flow-through.

What is claimed is:

1. A flow meter body for measuring a flow velocity and/or a volumetric through-flow of a fluid comprising a tubular center piece forming a wall and having flanges for connection to a pipe, probes, and a signal processor, the tubular center piece defining on its exterior at least two substantially planar mounting surfaces that are parallel to each other and at an angle to a longitudinal axis of the center piece and a mounting area for the signal processor spaced apart from the mounting surfaces, each mounting surface including a receptacle for receiving the probes so the probes define a measuring path, bores extending inside the wall of the center piece from the mounting surfaces to the mounting area, and electric connections extending from the probes through the bores to the mounting area for connection to the signal processor when the processor is mounted at the mounting area.

2. A flow meter according to claim 1 wherein the signal processor is in direct contact with the mounting area, and wherein the electric connections extend from ends of the bores directly to the signal processor so that the connections are not exposed to the surrounding environment.

3. A flow meter according to claim 1, including at least two additional mounting surfaces which are parallel to the first mounting surfaces and which are arranged rotatably offset relative to an axis that is perpendicular to the longitudinal axis.

4. A flow meter body according to claim 3, wherein mounting surfaces which are adjacent each other in a longitudinal direction are mirror symmetric to a central plane of the flow meter body which is perpendicular to the longitudinal axis.

5. A flow meter body according to claim 1, wherein the measuring direction of the probe is perpendicular to the mounting surface therefor.

6. A flow meter body according to claim 1, including a cap covering the probe, the cap also covering a connection to the associated probe over at least a part of its length.

7. A flow meter body according to claim 1, wherein at least one of the mounting surface pairs defines at least two measuring paths.

8. A flow meter body according to claim 1, wherein the center piece with the connecting flanges and the receptacles for the probes are made of a single piece of material.

9. A flow meter body according to claim 1, wherein the flow meter body comprises a unitary, one-piece cast body.

10. A flow meter body according to claim 1, wherein it includes a signal processing unit arranged on a side of the center piece which does not define a mounting surface.

11. A flow meter body according to claim 6, wherein the cap covers the associated mounting surface together with the probe.

12. A flow meter for measuring a flow velocity and/or a volumetric through-flow of a fluid comprising a tubular center piece being of a unitary, one-piece construction forming a wall and including flanges for connection to a pipe, the center piece having a length that is about three times a diameter of the pipe, probes, and a signal processor, the tubular center piece defining on its exterior first and second pairs of substantially planar mounting surfaces that are parallel to each other, at an angle to a longitudinal axis of the center piece and mirror symmetric relative to a central plane of the tubular center piece which is perpendicular to the longitudinal axis, and a mounting area for the signal processor spaced apart from the mounting surfaces, the mounting surfaces including receptacles for receiving the probes so the probes define first and second measuring paths, bores extending inside the wall of the center piece from the mounting surfaces to the mounting area, and electric connections extending from the probes through the bores to the mounting area for connection to the signal processor mounted at the mounting area.

13. A flow meter according to claim 12, wherein the measuring paths have differing distances to the longitudinal axis.

* * * * *